United States Patent Office 3,496,885
Patented Feb. 24, 1970

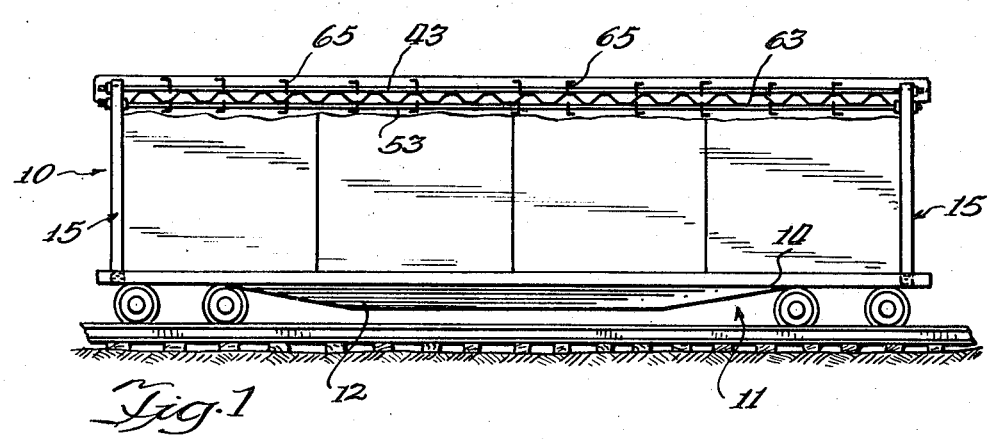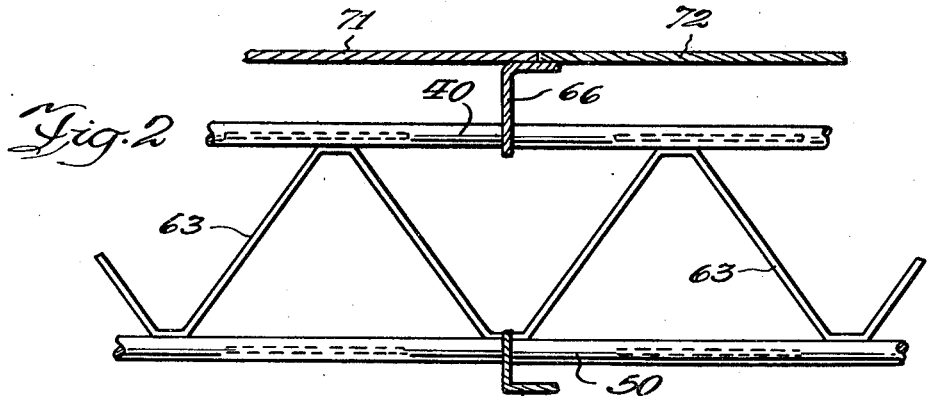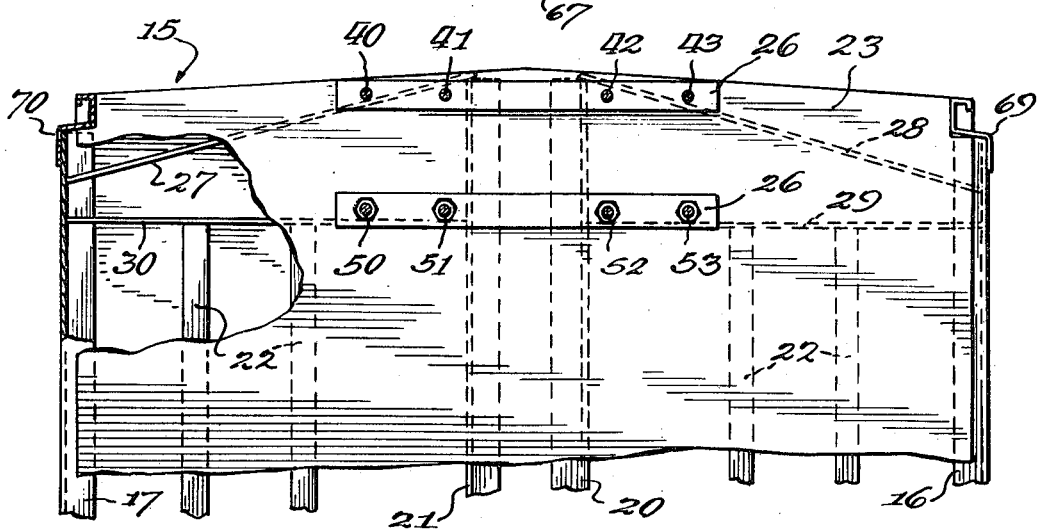

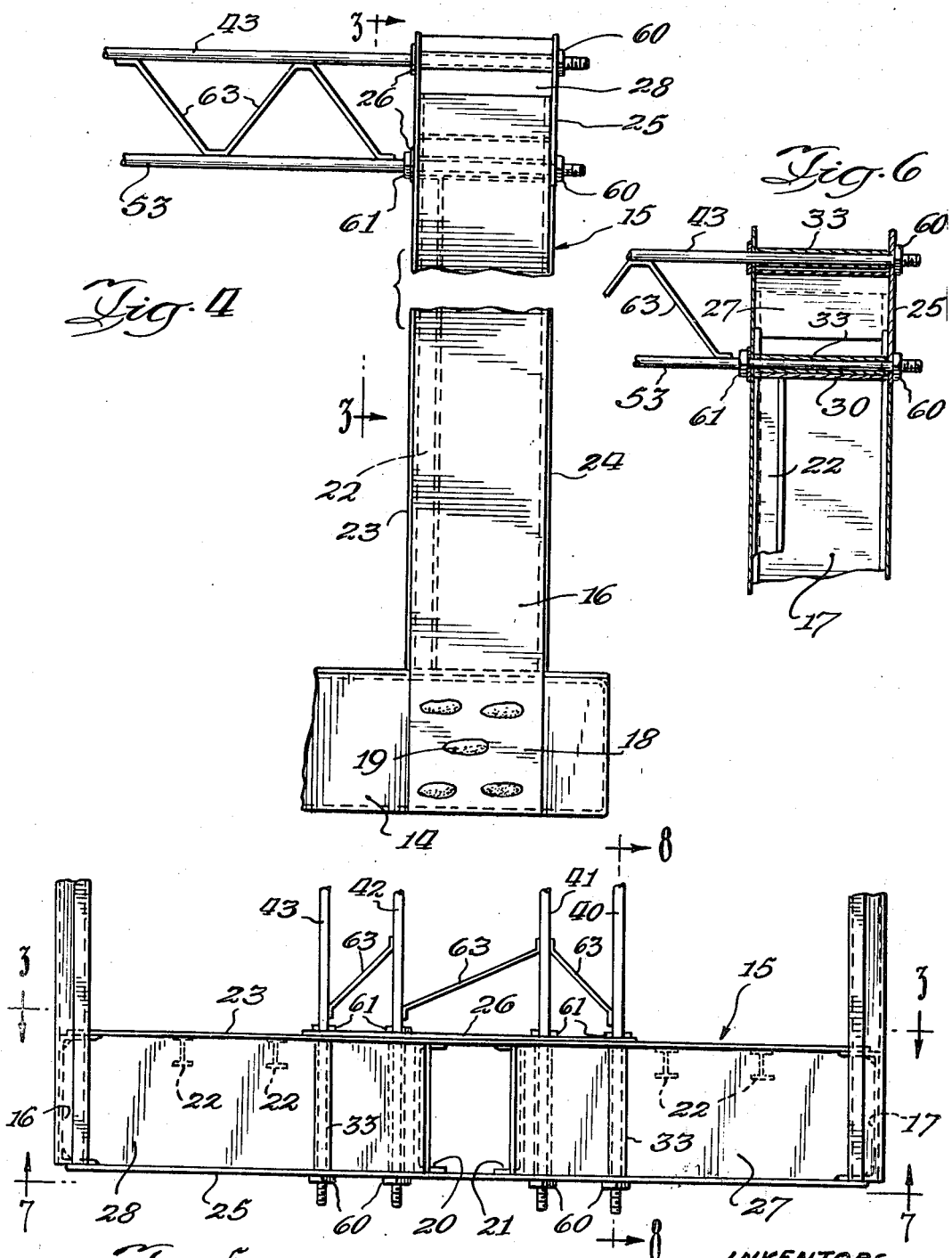

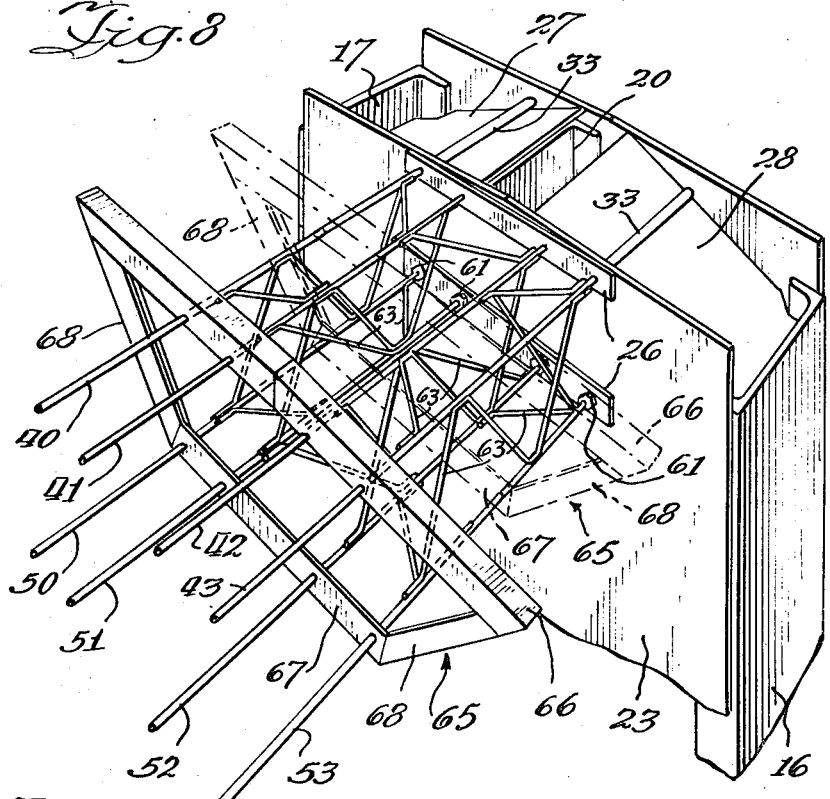
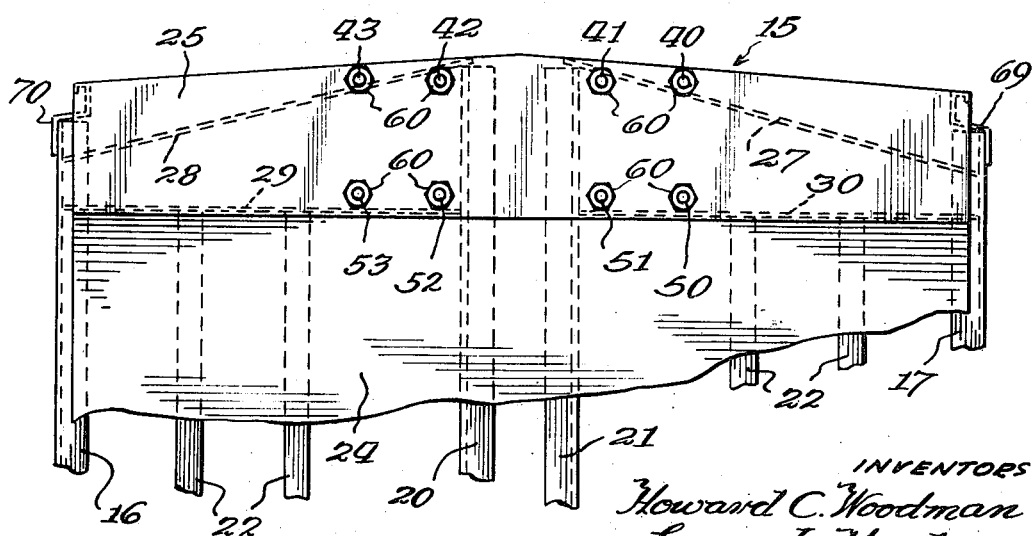

3,496,885
FREIGHT VEHICLE HAVING ROOF SUPPORTED BY PRESTRESSED CHORDS
Howard C. Woodman, Frankfort, Ill., and Lynn J. Harter, Hobart, Ind., assignors to Thrall Car Manufacturing Company, Chicago Heights, Ill., a corporation of Illinois
Filed June 7, 1967, Ser. No. 644,228
Int. Cl. B61d 17/12, 19/00, 3/16
U.S. Cl. 105—404                       8 Claims

ABSTRACT OF THE DISCLOSURE

Disclosed is a freight-carrying vehicle having its roof supported only by bulkheads at each end of the vehicle. The roof is carried by prestressed chords extending between the bulkheads. The roof supports side doors without further structural members leaving the floor and sides completely clear of obstructions.

---

This invention relates to enclosed freight-carrying vehicles, and especially railroad freight cars or boxcars. More particularly, it is concerned with a freight-carrying vehicle having a roof structure supported only by end bulkheads without the need for roof-supporting side walls or internal columns.

In conventional freight-carrying vehicles, vertical sidewalls attached to an underframe are used to support a roof structure. Sidewalls of this type use closely-spaced, vertical load-bearing structural members, the spacing and number of which limits the number of side access doors to ones which are relatively narrow with respect to the length of the vehicle body. Such narrow doors restrict versatility of the vehicle by restricting the loads which can be put in and carried by the vehicle. For example, in lumber service, long timbers cannot be conveniently loaded into the vehicle enclosed compartment.

To permit versatility in the use of enclosed freight-carrying vehicles, modifications in the construction of road and rail vehicles which permit the use of side doors which will provide an opening approximately half the length of the vehicle can be effected. Even in vehicles wherein special designs have been used to effect this objective, the type of construction used impedes effective loading of the vehicle. There are many instances when loading and unloading would be greatly facilitated by having doors constitute the entire side walls of the vehicle. With better access to the vehicle interior, more flexibility in using material handling personnel and equipment is achieved thus increasing efficiency, lowering costs and making the job easier.

There is provided in accordance with this invention a freight-carrying vehicle for road or rail service characterized by a roof supported by prestressed chord members. The roof does not require side wall or internal support, thus permitting the sides to be open or have all-door movable closures. The roof uses at least two pair of chords supported at each end by spaced apart bulkheads at each end of the vehicle. Each pair of chords has a top chord prestressed in tension at least when the vehicle is empty, and a bottom chord in compression at least when the vehicle is substantially loaded. The roof has strength and rigidity for supporting side wall doors along the entire length of the vehicle body without additional roof support. This leaves the sides and entire floor area of the vehicle devoid of roof supporting obstructions which would interfere with freight handling. The use of prestressed chords to support the roof eliminates the need for any other roof supports and does so efficiently with low construction cost by avoiding costly structural beams that must be rolled, pressed or stamped to shape.

Although this invention has broad application in the construction of load-carrying vehicles, it has particular use in railroad freight or boxcars. For this reason, and to facilitate an understanding of the invention, the following description will concentrate on its use in freight car construction. It is understood, however, that the invention is not so limited.

In the drawings of the illustrative embodiment of the invention:

FIGURE 1 is a side view of a railroad freight car having all door sides with the roof broken away to show the prestressed chords which support the roof;

FIGURE 2 is a side view, partially in section, showing a pair of prestressed chords supporting a roof rafter and roof thereon;

FIGURE 3 is an elevational view showing the upper inside of a bulkhead at the end of the freight car;

FIGURE 4 is a side elevational view of the bulkhead at one end of the freight car;

FIGURE 5 is a plan view of one end of the bulkhead of the freight car with the roof removed for clarity;

FIGURE 6 is a sectional view taken along the line 8—8 of FIGURE 5;

FIGURE 7 is an elevational view showing the upper outside end of one bulkhead of the freight car; and FIGURE 8 is an isometric view of the inside of a bulkhead showing prestressed chords connected thereto and supporting roof rafters.

So far as is convenient, the same identifying number will be used in regard to the same elements or members in the various views of the drawings.

The freight car 10 shown in FIGURE 1 has a more or less conventional underframe 11. The underframe has a center sill 12, side sills 14 as shown in FIGURES 6 and 7, and bolsters (not shown) which connect the side sills and the center sills together. In practicing the subject invention, the structure of the underframe can be of any suitable design, it being only important that the underframe be adequate to support loads to be carried by the freight car and of sufficient strength to provide a strong supporting means for the two bulkheads 15 positioned at each end of the freight car.

Because the bulkheads 15 must resist bending stresses imposed thereon by the prestressed roof chords plus the weight of the roof structure and doors which are supported thereby, as well as impact forces, they are stoutly constructed. As shown in the drawings, with particular reference to FIGS. 4 and 5, each bulkhead has heavy channel members 16 and 17 positioned vertically at its edges. The lower flanges on channel members 16 and 17 are removed and the flat webbed portion 18, as shown in FIGURE 4, is placed in abutting contact with the adjacent side sills 14 and secured thereto, as by welding. To provide additional welding area, holes 19 can be placed in the webbed portion 18 and welds therearound secured to the web as well as to the side sill 14.

Two vertically positioned channel members 20 and 21 are positioned more or less centrally in the bulkhead, in line with channel members 16 and 17, and they are secured to the underframe. Four I-beams 22 are also positioned vertically in the bulkhead adjacent the inside end wall surface of the bulkhead and they are attached at their lower end to the underframe. Plate 23 is placed vertically on the inside of the bulkhead end against channel members 16, 17, 20 and 21 and I-beams 22 to form an inner wall and plate 24 is positioned vertically against channel members 16, 17, 20 and 21 to provide an outside bulkhead wall. The upper part of the outer wall 24 is provided with a plate 25 slightly heavier than plate 24 for added strength. Similarly, plates 26 are placed over plate 23 to provide added strength in the vicinity of the prestressed chords on the inside wall.

Positioned between the inner end or wall 23 and outer end or wall 25 of the bulkhead are plates 27 and 28 placed at an angle to the horizontal direction. Plates 29 and 30 are placed horizontally between the bulkhead ends 23 and 25 resting on top of I-beams 22. Plate 29 extends between channel members 16 and 20, and plate 30 extends between channel members 17 and 21.

A top horizontal row of holes extending through the bulkhead 15 receives four spaced apart upper chord members in the form of rods 40, 41, 42 and 43. A lower horizontal row of holes extending through bulkhead 15 receive four spaced apart lower chord members in the form of rods 50, 51, 52 and 53. The chords are positioned to act more or less in pairs with each pair having one chord above the other. Thus chords 40 and 50, 41 and 51, 42 and 52, and 43 and 53 function as pairs. Although four pair of chords are shown in the embodiment of the invention illustrated by the drawings, the invention can also be employed with as few as two pair of chords.

The chords or rods 40–43 and 50–53 extend the full distance between the bulkheads and through the holes provided therein. The ends of the rods are shown threaded and nuts 60 screwed thereon. The lower rods 50–53 are threaded far enough to permit nuts 61 to be threaded on and positioned against the inside wall of the bulkhead. Tubular sections 33 are positioned between the bulkhead walls for reinforcing them and the rods 40–43 and 50–53 extend through the same. Braces 63 are positioned vertically between each pair of rods as well as horizontally between adjacent lower rods and obliquely between a lower rod and an upper rod to make the structure rigid enough to withstand compressive forces.

The rods 40–43 and 50–53 support a plurality of spaced apart roof trusses 65. The trusses 65 comprise a top roof rafter 66 supported by rods 40–43, and a lower stringer 67 supported by rods 50–53. The ends of the rafter 66 and stringer 67 of each truss 65 are connected by joining members 68 to thereby form a rigid structure. The rods can extend through holes in the rafters and stringers, as shown in the drawings, or they can be placed in abutting position thereto. The trusses can be held against lateral movement with respect to the rods by appropriate means, such as welding. Extending along the ends of the rafters 66 and attached thereto are top horizontal side plates 69 and 70 which extend for the full length of the freight car and are parallel to the side sills. The side plates 69 and 70 are advisably not rigidly joined to the bulkheads in order that tension on the bulkheads can be applied or maintained without buckling the same. The side plates 69 and 70 support the edges of the roof plates as well as support hardware for the side doors whether they be plug doors or sliding doors.

As shown in FIGURE 2, rafters 66 support roof plates 71 and 72 of conventional design.

The chords or rods 40–43 and 50–53 can be conveniently prestressed in tension by tightening nuts 60 with nuts 61 released. To aid in prestressing the rods, the freight car can be loaded overweight to apply maximum stress to the underframe. This will cause the bulkheads to tip inwardly slightly thus shortening the distance between them at which condition nuts 60, at least on the upper chords and advisably also on the lower chords, can be tightened securely and means used to keep the nuts from loosening such as welding or a second locking nut. The load can then be removed from the freight car causing the rods to remain in tension at least when the car is empty and desirably until the car is substantially loaded.

After the rods or chords are prestressed in tension, it is sometimes advisable to provide means by which at least the lower chords or rods 50–53 are placed in compression after the car is substantially loaded. This can be effected by tightening nuts 61 securely against plates 26 with the chords prestressed in tension. Compressive forces exerted against lower chords 50–53 are withstood without buckling of the chord members because of trusses 65 and braces 63 which resist such buckling forces.

Instead of using round rods as shown in the drawings, square rods, circular or rectangular tubes, beams, angles, or cables can be used for the chord members.

It will occur readily to others that means besides those described can be used to apply the desired tension to the chord members including screw jacks, wedges, springs, levers, pulleys, and winches and such other means are intended to be within the concept of this invention. Furthermore, instead of nuts to induce or create the desired prestressing, means such as pins, welding, riveting and bent ends can be employed to fix the ends of the chord members relative to the bulkheads to which they are joined.

By employing the described invention, the roof can be readily supported with minimum deflection, while keeping weight to a minimum, without any need to support the roof by sidewalls or internal car supports of any kind. Furthermore, by having at least the lower chord members in compression at least when the freight car is substantially loaded, deflection of the underframe is resisted and impact forces are distributed between both bulkheads rather than only one.

What is claimed is:

1. A freight-carrying vehicle comprising:
   an underframe, including side sills, end sills and a floor on said underframe,
   a vertical bulkhead projecting upwardly from each end of the underframe,
   at least two pairs of chords extending from near the top of one bulkhead to near the top of the other bulkhead,
   each pair of chords having a top chord prestressed in tension at least when the vehicle is empty, and a bottom chord in compression at least when the vehicle is substantially loaded,
   a plurality of spaced apart roof rafters supported by the chords in a direction substantially normal thereto,
   a longitudinal side plate on each side of the vehicle supported by and joined to the rafter proximal ends and extending to each bulkhead,
   roof plates on the rafters, and
   a plurality of movable door members forming closures between the side plates and side sills.

2. A vehicle according to claim 1 in which the chords are metal bars, and braces extend between and join the bottom and top chords.

3. A vehicle according to claim 1 in which all the chords are in tension when the vehicle is empty.

4. A vehicle according to claim 1 in which at least the top chords have threaded metal ends which are secured to retaining plates on the bulkheads by nuts, and prestressing of such chords is effected by the nuts.

5. A vehicle according to claim 1 in which the bottom chords have retaining means about at each end which press against the bulkheads when these chords are in compression, and support means in which the bottom chord ends are supported free of tensile forces induced by outward movement of the bulkheads.

6. A vehicle according to claim 1 in which the roof rafters ars supported by at least the top chords.

7. A vehicle according to claim 1 in which the longitudinal side plates have ends unattached to the bulkheads.

8. A railroad freight car comprising:
   an underframe, including side sills, end sills and a floor on said underframe,
   a vertical bulkhead projecting upwardly from each end of the underframe,
   at least two pairs of metal chords extending from near the top of one bulkhead to near the top of the other bulkhead, each pair of chords having a top chord prestressed in tension at least when the vehicle is empty, and a bottom chord in compression at least when the vehicle is substantially loaded, the top chords being in one horizontal plane and the bottom chords in another horizontal plane, braces joining the bottom and top chords, a plurality of spaced apart roof rafters supported by the chords in a direction substantially normal thereto, a longitudinal side plate on each side of the vehicle supported by and joined to the rafter proximal ends and extending to each bulkhead, the ends of the side plates being unattached to the bulkheads, and said side plates forming horizontal eaves parallel to the side sills, roof plates on the rafters, and a plurality of movable door members forming closures between the side plates and side sills for essentially the entire distance between the bulkheads on both sides of the freight car.

References Cited
UNITED STATES PATENTS

| | | | |
|---|---|---|---|
| 849,382 | 4/1907 | Emerick et al. | 105—404 |
| 1,400,140 | 12/1921 | Callery | 105—378 |
| 3,115,982 | 12/1963 | Morrison | 105—366 |
| 3,191,550 | 6/1965 | Adler et al. | 105—378 |
| 3,252,430 | 5/1966 | Eckhardt et al. | 105—238 |

ARTHUR LA POINT, Primary Examiner

R. A. BERTSCH, Assistant Examiner